Nov. 11, 1941.           M. A. EDWARDS                2,262,491
                     ELECTRIC CONTROL CIRCUIT
                      Filed Dec. 5, 1940
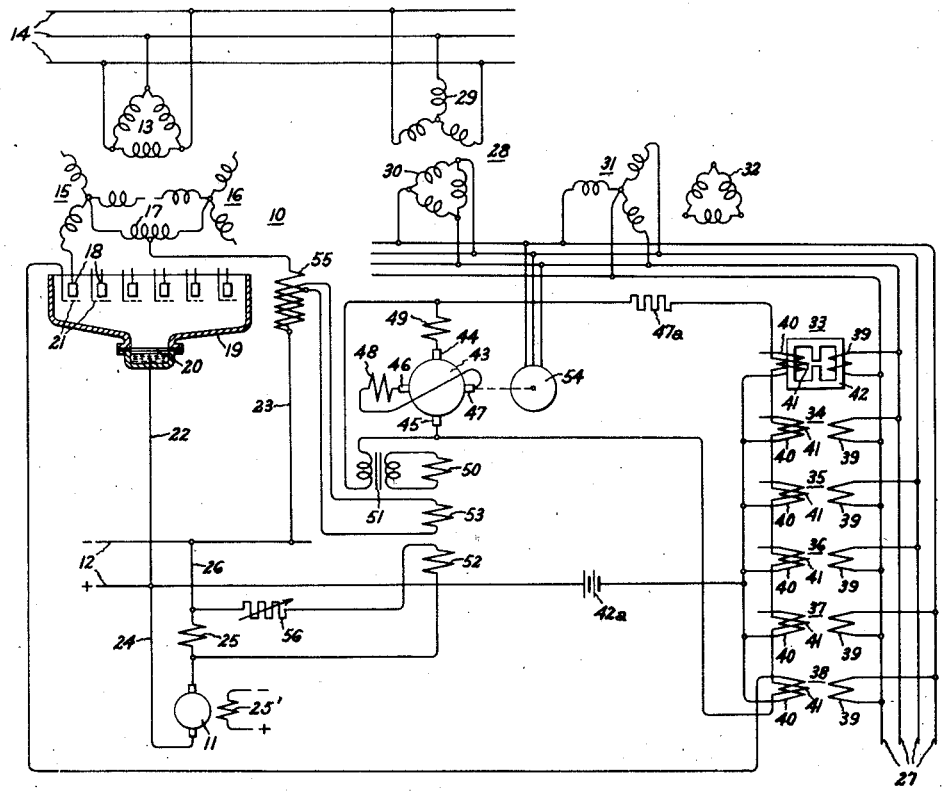
Inventor:
Martin A. Edwards,
by Harry E. Dunham
His Attorney.

Patented Nov. 11, 1941

2,262,491

UNITED STATES PATENT OFFICE 2,262,491

ELECTRIC CONTROL CIRCUIT

Martin A. Edwards, Scotia, N. Y., assignor to General Electric Company, a corporation of New York Application December 5, 1940, Serial No. 368,668

6 Claims. (Cl. 171—312)

My invention relates to electric control circuits and more particularly to improvements in electric control circuits for controlling the division of load current between a plurality of electric translating devices operating to supply energy to a common load circuit.

Heretofore various arrangements have been provided for maintaining a predetermined division of load between parallel operating electric translating devices such as a plurality of parallel operating electric valve systems or a plurality of dynamo-electric machines or a combination of parallel operating valve systems and dynamo-electric machines. These arrangements have in many respects provided a satisfactory solution to the problem of maintaining a division of load current between parallel operating devices, but in some cases and particularly in systems employing electric valve converting systems utilizing excitation transformers of the saturable or impulse type have had a slow response or have been subject to other disadvantages. In accordance with the teachings of my invention I provide an improved control system for maintaining a predetermined division of load current between parallel operating electric translating devices in which deviations from the predetermined division load current are effective to produce a controlling action of considerable power without any objectionable time delay.

It is an object of my invention to provide a new and improved electric control circuit.

It is another object of my invention to provide a new and improved electric translating system.

It is a further object of my invention to provide a new and improved control circuit which acts quickly and reliably to maintain a predetermined load distribution between parallel operating electric translating devices.

It is a still further object of my invention to provide a new and improved control circuit for electric valve translating apparatus.

In accordance with the illustrated embodiment of my invention I provide a new and improved control system for operating electric translating devices in parallel to supply a common load circuit. In the particular arrangement illustrated the control circuit is utilized to control the excitation of an electric valve rectifying system operating in parallel with a direct current generator. The electric valves are preferably each of the type which has a control member associated therewith which is energized from the secondary winding of a peaking transformer. The peaking transformer is provided with a primary winding energized from a source of alternating current voltage and a control winding for shifting the phase of the secondary peaked voltages impressed on the control members of the electric valves. The control windings of the peaking transformers are connected in series and energized from the output of an armature reaction excited type of direct current generator having a two-section control field winding energized in response to the current transmitted by the electric valve apparatus and the parallel operating direct current generator. The circuit is adjusted in such a way that with a predetermined division of load current the armature reaction excited generator provides no output voltage. The magnitude and polarity of the output voltage of the machine is variable in accordance with the magnitude and direction of the field produced by the two-section control field winding which in turn is dependent upon the extent of the deviations from the predetermined division of load current between the electric valve apparatus and the parallel operating electric generator.

My invention will be better understood by reference to the following description taken in connection with the accompanying drawing and its scope will be pointed out in the appended claims. In the drawing the single figure is a diagrammatic representation of one embodiment of my invention.

Referring now to the drawing, I have shown my invention as embodied in a system including an electric valve translating apparatus illustrated generally by the numeral 10 and a direct current generator 11 operating to supply energy to a direct current load circuit 12. The electric valve translating apparatus includes a transformer 13 having a delta connected primary winding energized from a three-phase alternating current supply circuit 14 and two three-phase Y-connected secondary windings 15 and 16 having the neutral terminals thereof interconnected by a phase equalizing reactor, or interphase transformer 17. The end terminals of the transformer windings 15 and 16 are connected to the anodes 18 of an electric valve converting unit 19 of the type utilizing an ionizable medium such as a gas or vapor and comprising in addition to the anodes 18 a single cathode 20 of conducting liquid and control members 21, one of which is associated with each of the anodes 18. While the converting unit 19 has been illustrated as of the type utilizing a plurality of anodes and a single cathode mounted within a common container, it will be apparent to those skilled in the art that any other type of electric discharge valve may be employed such as, for example, those in which a single anode and cooperating cathode with an immersion-igniter type of electrode are mounted within an individual container. The valve converting system is connected with the direct current circuit 12 by a conductor 22 connecting one side of the direct current circuit with the cathode 20 and by a conductor 23 connecting the midpoint of interphase transformer 17 with the other side of the direct current circuit 12. The direct current generator 11 has one terminal of the armature winding connected with one side of the direct current circuit 12 through a conductor 24 and the other terminal of the armature winding connected to the other side of the direct current circuit 12 through the series commutating field winding 25 and conductor 26. The generator is also provided with a field winding 25' which may be energized from any suitable source of direct current (not shown). The generator may be driven by any suitable means (not shown) and may, for example, be driven by an alternating current electric motor energized from the alternating current circuit 14.

In order to control the time in the anode-cathode voltage wave of the discharge paths formed between the anodes 19 and the cathode 20 at which the discharges are initiated it is necessary to provide means for periodically energizing the control member 21 with a positive potential to render the discharge paths conductive. As illustrated in the drawing, I provide an alternating control voltage supply circuit 27 energized from the alternating current circuit 14 by means of a transformer 28 having a Y-connected primary winding 29 energized from the alternating current circuit 14 and a delta-connected secondary winding 30 connected to energize three of the lines of the alternating current circuit 27. In order to establish a neutral line for the circuit 27, I provide a Y-connected inductive winding 31 having the neutral terminal connected to the neutral line of the circuit 27. In order to form a closed circuit for the third harmonic current a delta winding 32 is associated with winding 31 on the same core structure. The circuit 27 including the neutral terminal provides alternating current voltages having suitable phase relations for controlling the excitation of the control members 21. It is of course possible to obtain this alternating current control voltage from the circuit 14 in other ways such as through a phase shifter having relatively movable windings which are adjusted to provide the desired phase shift between the alternating current voltage of circuit 14 and the alternating current voltage obtained from the output of the phase shifter.

In accordance with one feature of my invention means are provided for energizing the control electrodes 21 with periodic voltages of peaked wave form which are varied in phase with respect to the anode-cathode voltages in accordance with the division of load current between the electric valve translating apparatus and the direct current machine 11. The excitation voltages are derived from the circuit 27 by means of a plurality of saturable inductive devices or peaking transformers 33 to 38, each of which includes a primary winding 39, a secondary winding 40, and a direct current control winding 41. A suitable core structure 42 for a peaking transformer of this character is illustrated in connection with the transformer 33. It will be obvious to those skilled in the art that a similar core structure is provided for each of the other peaking transformers. One terminal of each of the secondary windings 40 is connected to the cathode of the valve converting unit 19 through a negative biasing means such as the battery 42a. The other terminal of each of the secondary windings 40 is connected with one of the control members 21. For the sake of clarity in the drawing only one of these has been illustrated as connected with a control member. A suitable current-limiting resistor (not shown) may be provided in circuit with each of the control members 21 if desired.

In operation of electric valve translating apparatus of the type described in the foregoing paragraph it is well understood that the voltage or current output may be controlled by controlling the time in the anode-cathode voltage wave at which the discharge paths are rendered conductive. With the particular type of excitation transformer illustrated, it is also well understood that the peak of the excitation potentials may be shifted by means of a direct current magnetomotive force induced in the core structure of the peaking transformers by means of the direct current control windings 41. When operating an electric valve translating system in parallel with another electric valve translating system, or as illustrated in parallel with a direct current generator, there is a tendency for one or the other of these devices to take more than its proportionate share of the load and in accordance with my present invention, improved means are provided for controlling the energization of the control windings 41 of the transformers 33 to 38 to maintain a desired division of load between these parallel operating devices.

The windings 41 of the transformers 33 to 38 are connected in series and to the output of a direct current generator 43 to of the armature reaction excited type which is more fully described and claimed in the copending application of Ernst F. W. Alexanderson and M. A. Edwards, Serial No. 281,008, filed June 24, 1939, and assigned to the same assignee as this invention.

The generator 43 has a pair of secondary or output brushes 44 and 45 which are connected to energize the serially connected control winding 41 of the saturable excitation transformers 33 to 38, and a pair of primary brushes 46 and 47 which are electrically displaced from, and in the particular arrangement illustrated, are in quadrature relation with the secondary brushes 44 and 45. A current limiting resistor 47a may be included in circuit with the windings 41, if desired. The primary brushes 46 and 47 may be permanently short circuited or, as illustrated, connected together through a comparatively low impedance field winding 48. The field winding 48 is arranged to produce a field in the same direction as that produced by the armature reaction of the armature winding connected in circuit with the primary brushes 46 and 47. The generator is also provided with a compensating winding 49 which is connected in the external circuit of the secondary brushes 44 and 45. This winding is designed to produce an excitation component which substantially neutralizes the armature reaction of the generator along the axis of the brushes 44 and 45 due to the load current. An anti-hunting winding 50 is also provided for minimizing the hunting action of the generator output. The winding 50 is energized from the transient direct current voltages appearing at the generator secondary brushes through a transformer 51. The generator 43 is also provided with control field winding means including two control winding sections 52 and 53 which are wound to produce magnetic fields in opposite directions. These two winding sections are in magnetic opposition so that when conducting the same amount of current produce no net field in the machine. When the currents flowing in the two control field winding sections are unequal the net excitation for the generator is the difference between the fields set up by the two winding sections individually and in the direction of the field produced by the winding carrying the greater current. A motor 54 energized from circuit 27 provides means for rotating the armature of the machine 43 at substantially constant speed.

Since the brushes 46 and 47 are either short circuited or connected in a very low impedance circuit only a very small amount of flux is required to produce a relatively large flow of primary current through that part of the armature winding which is connected between these brushes when the armature is rotated. This primary current produces a magnetic flux and as the armature rotates the conductors connected between the secondary or output brushes 44 and 45 cut this magnetic flux and a voltage is induced between these brushes which is dependent upon the direction and magnitude of the net field produced by the control field winding sections 52 and 53.

The secondary armature reaction due to the secondary current of the generator 43 is in a direction which opposes the field produced by the control field winding sections 52 and 53. In order to increase the sensitivity of the control accomplished by the generator 43 in response to variations in the excitation component produced by the control field winding sections 52 and 53 a compensating winding 49 is provided which is wound to produce an excitation component which neutralizes the secondary armature reaction flux. With this arrangement the control field windings 52 and 53 are required to supply only a small excitation to produce a relatively large output voltage. The control field windings are of few turns, have low inductance and require small power to produce a substantial output power for control purposes, and provide for a rapid change in output in response to a change in the energization of the control field windings.

As previously indicated, the generator 43 is utilized to control the energization of the direct current windings of the transformers 33 and 38 to maintain a predetermined division of load between the electric valve translating apparatus 10 and the dynamo-electric machine 11. In order to affect this control one of the field winding sections 53 is energized in accordance with the current transmitted to the load circuit 12 by the electric valve translating apparatus and the field winding section 52 is energized in accordance with the current transmitted to the load circuit by the direct current machine 11. The control field winding 53 is energized by the voltage appearing across a portion of the winding of an impedance element 55 connected in the direct current circuit of the electric valve translating system 10. The impedance element illustrated in the drawing includes a winding which has a portion thereof wound back upon itself so that the alternating current component of voltage induced therein because of the ripple current in the direct current circuit of the electric valve translating apparatus, is substantially eliminated. The control field winding 52 is connected to be energized in accordance with the current of the parallel connected unit and as illustrated is energized from the voltage appearing across the commutating field winding 25 of the direct current generator 11 through a circuit including a variable resistor 56 which may be provided for making an initial adjustment of the excitation of the field winding sections 52, 53, to determine the distribution of load.

From the foregoing detailed description it is believed that the operation of the system in accordance with my invention will be readily understood by those skilled in the art. When the electric valve translating apparatus 10 and the direct current generator 11 are operating to supply current to the load circuit 12 in a predetermined ratio, the fields 52 and 53 of the armature reaction excited generator 43 are of equal magnitude and produce a net zero excitation of the machine. When, for any reason, the current distribution between the parallel operating devices departs from the predetermined ratio one of the field windings 52 or 53 becomes predominant and produces a flux in the machine 43 which, upon rotation of the armature thereof, causes a rather large current to flow in the armature winding short circuited by the primary brushes 46 and 47. The armature reaction flux resulting from the current flowing in the short circuited armature winding induces a voltage which appears across the secondary brushes 44 and 45. When the excitation of field winding 52, for example, is increased relative to the excitation of field winding 53 due to an increase in current supplied by the machine 11, the voltage output of the armature reaction excited generator increases in magnitude and has a predetermined polarity. This voltage is impressed on the direct current control windings 41 of the excitation transformers to produce a magnetomotive force in a direction to advance the phase of the periodic potentials impressed on the control members of the electric valve converting unit 19. This advances the time in the anode-cathode voltage wave at which the discharge paths are rendered conductive and operates to restore balanced current conditions between the parallel operating devices. If the unbalance occurs in the opposite direction the control field winding 53 predominates and the output voltage of the dynamo-electric machine 43 immediately reverses and has a magnitude dependent upon the amount of the departure from the predetermined load distribution. The control windings 41 of the transformers 33 to 38 then produce a magnetomotive force in a direction to retard the phase of the excitation voltage of the control members 21 of the electric valve converting unit 19. In this way, any tendency of the electric valve translating apparatus and the dynamo-electric machine to carry other than their proportionate share of the load is corrected by an adjustment of the phase of the periodic potentials impressed on the electric valve converting unit. The armature reaction excited machine is particularly advantageous in producing this control in systems utilizing direct current control windings associated with peaking transformers inasmuch as these windings usually present considerable impedance and operate rather slowly when energized directly from shunts or other static means for deriving a voltage dependent upon the distribution of current conducted by the parallel operating devices.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a load circuit, a plurality of electric translating devices operating in parallel for supplying energy to said load circuit, a control circuit for maintaining a predetermined distribution of load current between said electric translating devices comprising a direct current generator of the armature reaction excited type including a pair of secondary brushes and with a pair of primary brushes electrically displaced with respect to said secondary brushes, a control field winding for said generator, means for energizing said control field winding to produce an excitation of said generator dependent upon the distribution of load current between said translating devices, and means responsive to the voltage of said pair of secondary brushes for controlling the operation of at least one of said translating devices to maintain said predetermined division of load current between said devices.

2. In combination, a load circuit, a plurality of electric translating devices operating in parallel for supplying energy to said load circuit, a control circuit for maintaining a predetermined distribution of load current between said electric translating devices comprising a direct current generator of the armature reaction excited type including a pair of secondary brushes, a pair of primary brushes electrically displaced with respect to said secondary brushes and interconnected by a low impedance circuit, control field winding means for said generator, means for energizing said control field winding means to produce an excitation of said generator dependent upon the distribution of load current between said translating devices, a compensating field winding for providing a component of excitation responsive to current conducted by said secondary brushes along substantially the same axis and in opposition to the armature reaction flux due to electric current flowing through said secondary brushes, and means energized from said secondary brushes for controlling the operation of at least one of said translating devices to maintain said predetermined division of load current between said devices.

3. In combination, an alternating current circuit, a load circuit, a plurality of electric translating devices operating in parallel for transmitting energy to said load circuit and including at least one electric valve means energized from said alternating current circuit, a control member for controlling the conductivity of said electric valve means, means for effecting a predetermined distribution of load current between said electric valve means and the other of said translating devices, comprising means for impressing on said control member a periodic voltage, means for producing a direct current voltage reversible in polarity and variable in magnitude for controlling the phase of the voltage impressed on said control member including a direct current generator of the armature reaction excited type including a pair of secondary brushes, a pair of short circuited primary brushes electrically displaced from said secondary brushes and control field winding means energized in response to the direction and magnitude of the departure of the current conducted by said electric translating devices from said predetermined distribution of load current between said devices to control the polarity and magnitude of said direct current voltage, and means for modifying said periodic voltage in accordance with said direct current voltage to vary the time of initiation of discharge in said electric valve means in accordance with the distribution of load current between said parallel operating electric translating devices.

4. In combination, a supply circuit, a load circuit, a plurality of electric translating devices operating in parallel for transmitting energy to said load circuit and including at least one electric valve means, a control member for controlling the conductivity of said electric valve means, means for effecting a predetermined distribution of load current between said electric valve means and the other of said translating devices comprising a saturable inductive device for impressing on said control member periodic voltages of peaked wave form, a control winding associated with said inductive device, means for energizing said control winding to control the phase of the voltage impressed on said control member including a direct current generator of the armature reaction type including a pair of secondary brushes associated with said control winding, and control field winding means energized in response to variations from said predetermined current distribution to control the direction and magnitude of the voltage impressed on said control winding.

5. A load distribution control system for electric translating devices operating in parallel to supply a common load, said translating devices including at least one electric valve means having a control electrode associated therewith for controlling the conductivity thereof comprising means for energizing said control electrode with a periodic voltage including a saturable inductive device having a control winding for controlling the phase of the voltage impressed on said control electrode, means for energizing said control winding to maintain a predetermined distribution of load current between said translating devices comprising a direct current generator provided with a pair of secondary brushes associated with said control winding and with a pair of primary brushes electrically displaced with respect to said secondary brushes and connected externally through a low impedance circuit, a compensating field winding for said generator for substantially neutralizing the armature reaction excitation along the axis of said secondary brushes, a field winding for said generator, load distribution responsive means for controlling the excitation of said field winding thereby to control the magnitude and polarity of the voltage impressed on said control winding in accordance with the direction and magnitude of the departure from said predetermined distribution of load current conducted by said translating devices.

6. In combination, a load circuit, a plurality of electric translating devices operating in parallel to supply energy to said load circuit, at least one of said translating devices comprising a plurality of electric discharge paths, a control member associated with each of said discharge paths for controlling the conductivity thereof, means for effecting a predetermined division of load current between said electric translating devices comprising a plurality of saturable inductive devices each including a core member, a winding for impressing on said core member an alternating magnetomotive force, a second winding associated with one of said control members, and a control winding for impressing on said core member a unidirectional magnetomotive force which varies in accordance with the distribution of load current between said electric translating devices to control the conductivities of said electric discharge paths, said control windings being connected in series, a direct current generator of the armature reaction excited type including a pair of secondary brushes connected to energize said control windings, a pair of primary brushes electrically displaced from said secondary brushes and a control field, and means for energizing said control field to produce an excitation of said machine which varies in accordance with the direction and magnitude of the departure of said predetermined distribution of load current between said plurality of discharge paths and the other of said electric translating devices.

MARTIN A. EDWARDS.